United States Patent [19]
Troisi et al.

[11] Patent Number: 5,722,532
[45] Date of Patent: Mar. 3, 1998

[54] CONVERGENT/DIVERGENT PRODUCT CONVEYOR

[75] Inventors: David A. Troisi, Ithaca; John E. Uber, Trumansburg, both of N.Y.

[73] Assignee: Hi-Speed Checkweigher Co., Inc., Ithaca, N.Y.

[21] Appl. No.: 745,210

[22] Filed: Nov. 8, 1996

[51] Int. Cl.[6] .................................................. B65G 47/46
[52] U.S. Cl. .............................. 198/890; 198/440; 198/449
[58] Field of Search ............................. 198/890, 890.1, 198/370.02, 370.03, 440, 449

[56] References Cited

U.S. PATENT DOCUMENTS

| | | | |
|---|---|---|---|
| 2,743,807 | 5/1956 | McKune | 198/30 |
| 3,009,572 | 11/1961 | Seaborn | 209/121 |
| 3,093,245 | 6/1963 | Worcester et al. | 209/121 |
| 3,129,803 | 4/1964 | Giulie et al. | 198/31 |
| 3,150,760 | 9/1964 | Nigrelli et al. | 198/31 |
| 3,165,193 | 1/1965 | Stevenson, Jr. | 198/31 |
| 3,167,171 | 1/1965 | Harmon et al. | 198/41 |
| 3,190,432 | 6/1965 | Vanderhoof | 198/31 |
| 3,244,267 | 4/1966 | Berta | 198/32 |
| 3,282,585 | 11/1966 | Dieter | 271/3 |
| 3,386,560 | 6/1968 | Ross et al. | 198/31 |
| 3,500,983 | 3/1970 | Watkins | 198/31 |
| 3,542,215 | 11/1970 | Fromme et al. | 198/370.02 |
| 3,601,243 | 8/1971 | Gurgacz | 198/30 |
| 3,710,923 | 1/1973 | Fromme et al. | 198/370.02 |
| 3,731,782 | 5/1973 | Del Rosso | 198/31 R |
| 3,749,225 | 7/1973 | Kennedy | 198/31 AA |
| 3,774,748 | 11/1973 | Dederer et al. | 198/32 |
| 3,791,518 | 2/1974 | Vanderhoof | 198/440 |
| 3,987,888 | 10/1976 | Wickam | 198/802 |
| 4,138,008 | 2/1979 | Del Rosso | 198/365 |
| 4,143,752 | 3/1979 | Del Rosso | 198/365 |
| 4,287,980 | 9/1981 | Montferme | 198/425 |
| 4,577,745 | 3/1986 | Calvert et al. | 198/440 |
| 4,632,238 | 12/1986 | Risi | 198/365 |
| 4,779,715 | 10/1988 | Pazdernik | 198/436 |
| 5,042,636 | 8/1991 | Underwood | 198/372 |

*Primary Examiner*—Joseph E. Valenza
*Attorney, Agent, or Firm*—Bean, Kauffman & Snyder

[57] ABSTRACT

A flow directing conveyor mechanism includes a lower conveyor defining an article supporting surface for transporting articles for movement along a path of travel extending between inlet and discharge ends of the lower conveyor; and an upper conveyor having pushing mechanisms for displacing articles, while supported by the surface, transversely of the path of travel, as an incident to movement of the articles between the inlet and discharge ends.

13 Claims, 7 Drawing Sheets

CONVERGENT/DIVERGENT PRODUCT CONVEYOR

BACKGROUND OF THE INVENTION

U.S. Pat. No. 3,731,782 discloses an article flow directing conveyor in accordance with which a single input line of articles is selectively separated into two or more output lines or two or more input lines are collected into a single output line.

In accordance with this prior conveyor mechanism, articles being conveyed are supported on one, two or more adjacently disposed article supports in the form of sliders, which are transported for movement along a path of travel extending between inlet and discharge ends of the conveyor, while being slidably displaceable transversely of the path of travel for purposes of moving articles between regions spaced transversely thereof.

In a flow diverting conveyor installation, sliders are collected in a single line in a first region of the conveyor adjacent the inlet end thereof and then passed to a flow directing station at which a first magnetic device is selectively operable to act on a magnetically attractable member carried one on each slider to divert sliders for movement into a second region, so as to create two output lines extending through such first and second regions. A third output line may be added for example by employing a second magnetic device to selectively direct sliders from the first region to a third region arrayed on a side of the first region opposite to that of the second region.

Each magnetic device includes a selectively operable electromagnet serving to attract the magnetically attractable members sufficiently to displace selected sliders transversely from the first region, whereupon such members pass into engagement with a guide surface associated with a permanent magnet for transport from adjacent the first region transversely of the path of travel into a region in which the members separate from the guide surface and their associated sliders form into a discharge line arranged parallel to the input line. After discharge of articles from the sliders, such sliders are collected by one or more convergent guide bars extending along a return flight of the conveyor into the input line. Additional discharge lines may be formed by separating the members from the guide surface intermediate the ends thereof.

In a flow converging conveyor installation, the previously described flow diverting conveyor installation is inverted and arranged to permit articles supplied by two or more input lines to be placed on parallel lines of sliders arranged to travel within two or more inlet regions, whereafter the sliders are collected into a common discharge line by one or more convergent guide bars prior to discharge of articles from the conveyor. After discharge of articles form the sliders arranged in the common discharge line, such sliders are acted on by one or more magnetic devices to selectively move the sliders transversely of the path of travel for forming the sliders to pass as parallel lines traveling through the two or more inlet regions.

Several drawbacks have been noted through experience with prior flow diverting and converging conveyor installations. In this respect, typical arrangements for mounting the sliders for transverse sliding movements impose a practical limit on the minimum diameter of the direction change sprockets which may be employed to support such sliders for movement along their path of travel. This limit in sprocket diameter places in turn a limit on the minimum footprint size of articles which can be transferred across the upstream and downstream ends of the conveyor without such articles tipping over.

A second drawback of prior installations is the requirement that their magnetic devices, and more particularly their guide surfaces, must be individually constructed and mounted to accommodate for differences in required/desired transverse spacings between the regions of different conveyors.

SUMMARY OF THE INVENTION

The present invention relates to flow directing conveyors adapted to perform article diverting or converging operations.

In accordance with one aspect of a preferred form of the present invention, a conveyor mechanism of the type generally described for example in U.S. Pat. No. 3,731,782 has each of its sliders fitted with a pair of paddles and is arranged vertically above an endless conveyor defining an article supporting surface across which articles, when engaged by the paddles, are forced to slide between regions of the conveyor surface spaced transversely of its path of travel. The conveyor mechanism may be arranged relative to the article supporting conveyor as desired to provide for article diverting or article converging operations.

An advantage of the present invention over prior flow director conveyors of the type described in U.S. Pat. No. 3,731,782 is that the diameter of the direction change sprockets of the flow director are not limiting on the footprint side of articles, which may be diverted. Rather, footprint size is limited by the substantially smaller minimum diameter of the direction change sprockets or rollers required to support the article surface defining conveyor element of the lower conveyor. Conveniently, this conveyor element may be a belt formed of a continuous sheet of material or multiple links designed to provide an essentially continuous article supporting surface, so long as the surface defined thereby permits unobstructed sliding movement of transported articles under the control of the slider mounted paddles.

A further advantage of the present invention over prior flow director conveyors is the design and mode of mounting the magnetic devices which allows the magnetic devices to be of common construction and adjustable to selectively vary the transverse spacing between regions to accommodate for the requirements of different conveyor installation.

BRIEF DESCRIPTION OF THE DRAWINGS

The nature and mode of operation of the present invention will now be more fully described in the following detailed description taken with the accompanying drawings wherein.

3

DETAILED DESCRIPTION

Figure 1:
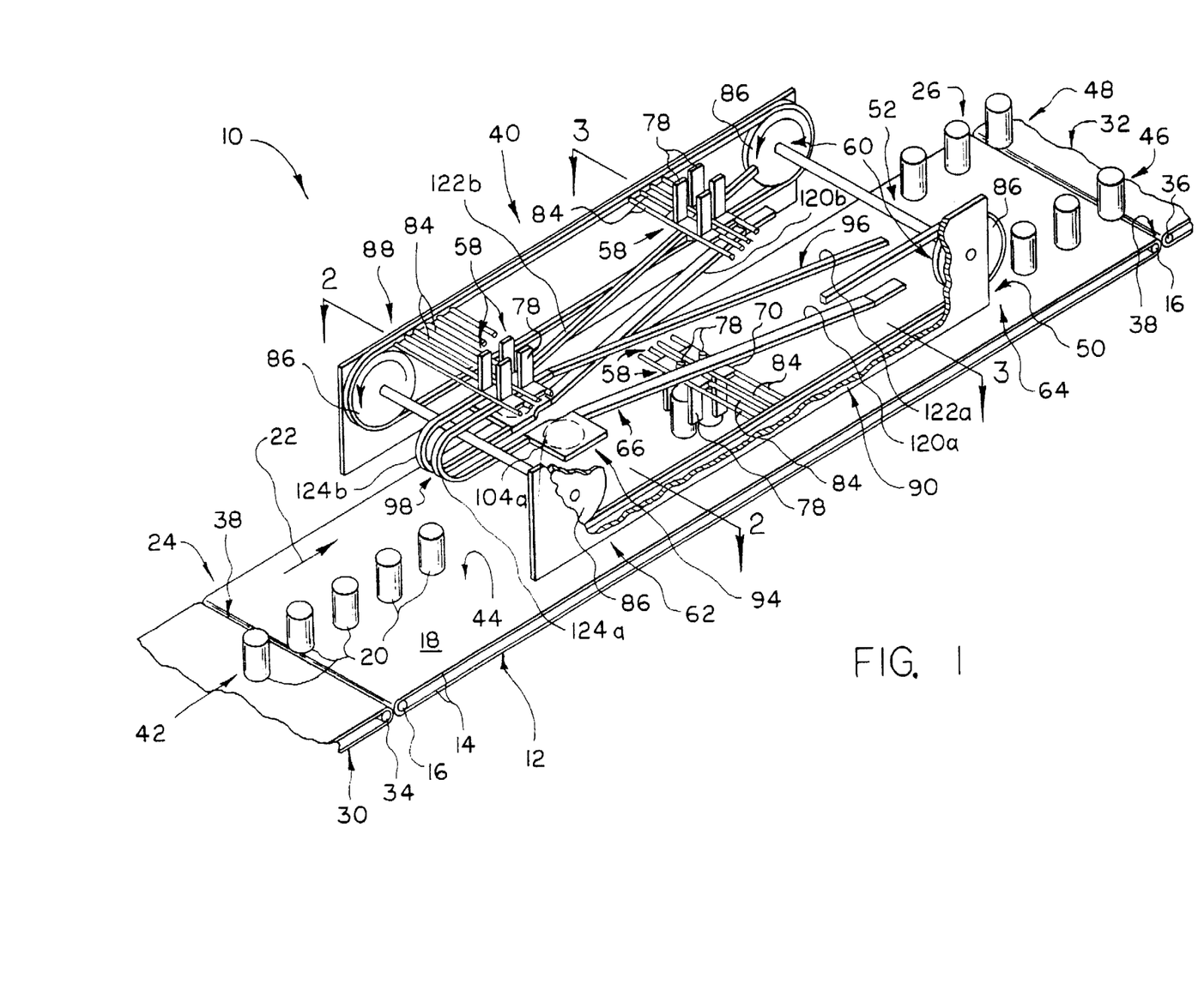
FIG. 1 is a fragmentary prospective view of a flow diverting conveyor formed in accordance with the present invention.

Reference is first made to FIG. 1, wherein a diverting type flow director conveyor formed in accordance with the present invention is generally designated as 10, and shown as comprising a first or lower article transporting conveyor 12 having an endless conveyor element, such as a belt 14, trained about a pair of direction change sprockets or rollers 16 to define a generally horizontal, upper conveyor flight providing an upwardly facing article supporting surface 18 for transporting articles 20 along a first path of travel indicated by arrow 22 between inlet end 24 and discharge end 26 of the lower conveyor. The term belt is meant to include a continuous sheet of material or link-type conveyor elements, which are adapted to provide an article supporting surface across which articles 20 may be readily slid without tipping over.

In a typical installation, conveyor 12 has its upstream or inlet end 24 and its downstream or discharge end 26 operably aligned with a suitable supply conveyor 30 and a suitable discharge conveyor 32, which have their discharge and inlet sprockets or rollers 34 and 36 placed closely adjacent direction change sprockets 16. Preferably, the diameters of the direction change sprockets of these three aligned conveyors are as small as practical, so as to allow the nips 38 defined by the ends of such conveyors to be relatively small as compared to the footprint size of articles 20 in the direction of path of travel 22 in order to avoid tipping over of such articles as they are transferred between conveyors. Conveyors 12, 30 and 32 may be driven by any suitable means, not shown.

A second or upper conveyor 40 is shown in FIG. 1 as being disposed vertically above conveyor 12 and as being adapted to selectively displace articles 20 from a single line 42 of articles 20 supported on surface 18 within a first or central region thereof 44 to define two parallel discharge lines of containers 46 and 48 arranged in second and third or side regions 50 and 52 of surface 18.

Second conveyor 40 includes at least one and preferably a plurality of pushing mechanisms 58, support means 60 for supporting the pushing mechanisms for movement along a second path of travel in vertical alignment with first path of travel 22 between second conveyor, first end 62 and second end 64, while permitting displacement of the pushing mechanisms transversely of the paths of travel; and displacing means 66 for selectively displacing the pushing mechanisms when transversely aligned with articles 20 for moving same between regions 44, 50 and 52.

Figure 7:
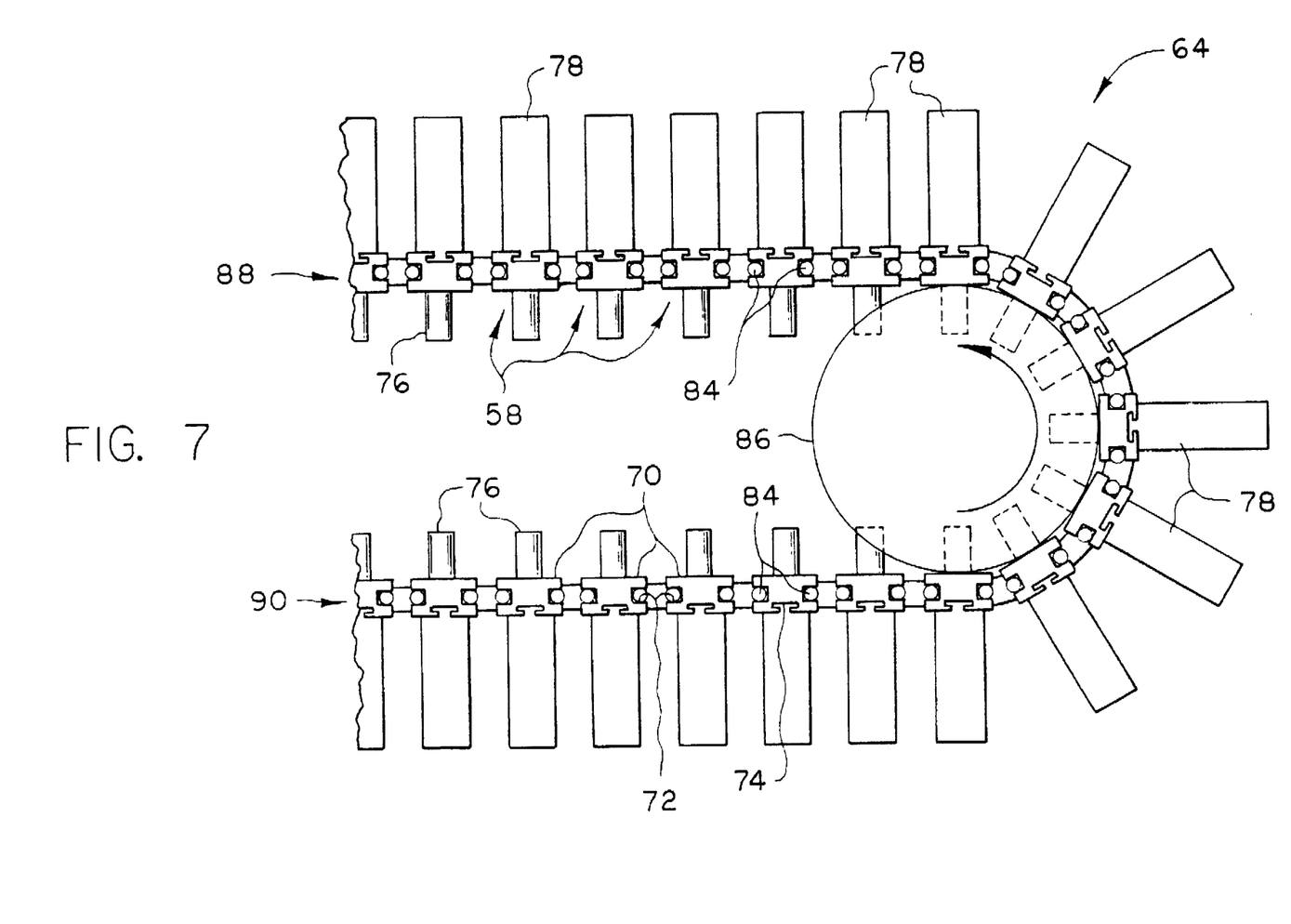
FIG. 7 is a fragmentary side elevational view of the discharge end of the uppermost conveyor showing one type of pushing mechanism.
Figure 9:
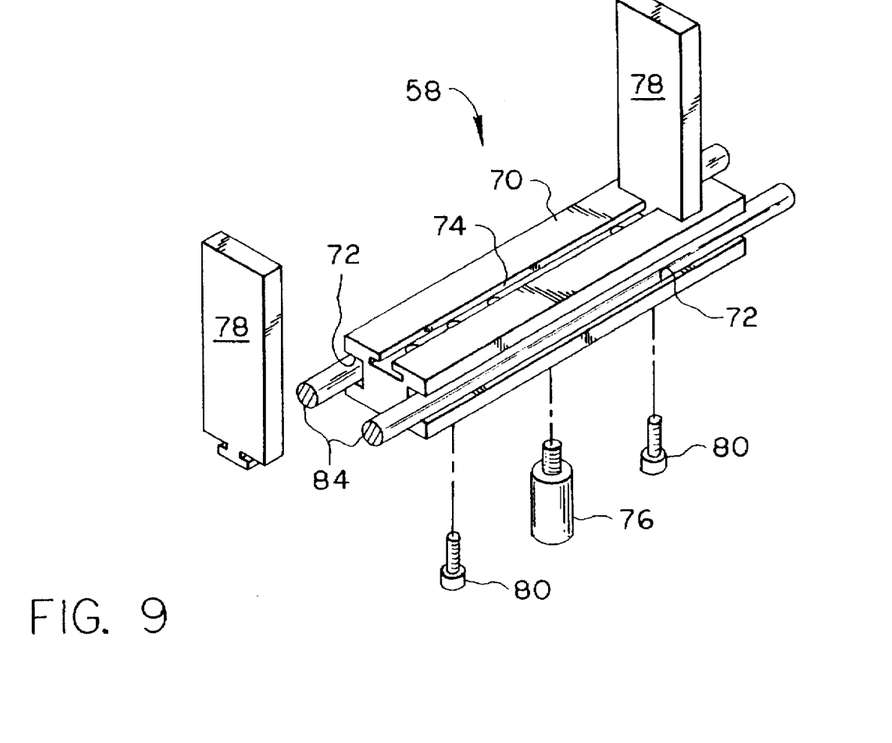
FIG. 9 is an exploded prospective view of the pushing mechanism of FIG. 7.

In a first form of the invention, pushing mechanisms 58 each includes a slider 70 best shown in FIGS. 7 and 9 as being in the form of a block of plastic material formed with a pair of parallel, lengthwise extending and oppositely-facing guide slots 72,72 and an intermediate lengthwise

4 extending mounting slot 74; a magnetically attractable member preferably in the form of a roller 76; and one and preferably a pair of paddles 76 and 78 which are adjustably fixed within slot 74 by threaded fasteners 80 in order to provide a distance between paddles, which is sufficient to freely accommodate the transverse dimension of individual articles 20.

Support means 60 includes a plurality of pairs of parallel rods 84,84 which are freely, slidably received within guide slots 72,72 and have their opposite ends suitably coupled together, as by roller chain links, not shown, to define an endless conveyor element trained about pairs of pulleys 86 and 86 to define upper and lower conveyor flights 88 and 90, respectively. Support means 60 may be driven by any suitable drive motor, not shown.

Figure 3:
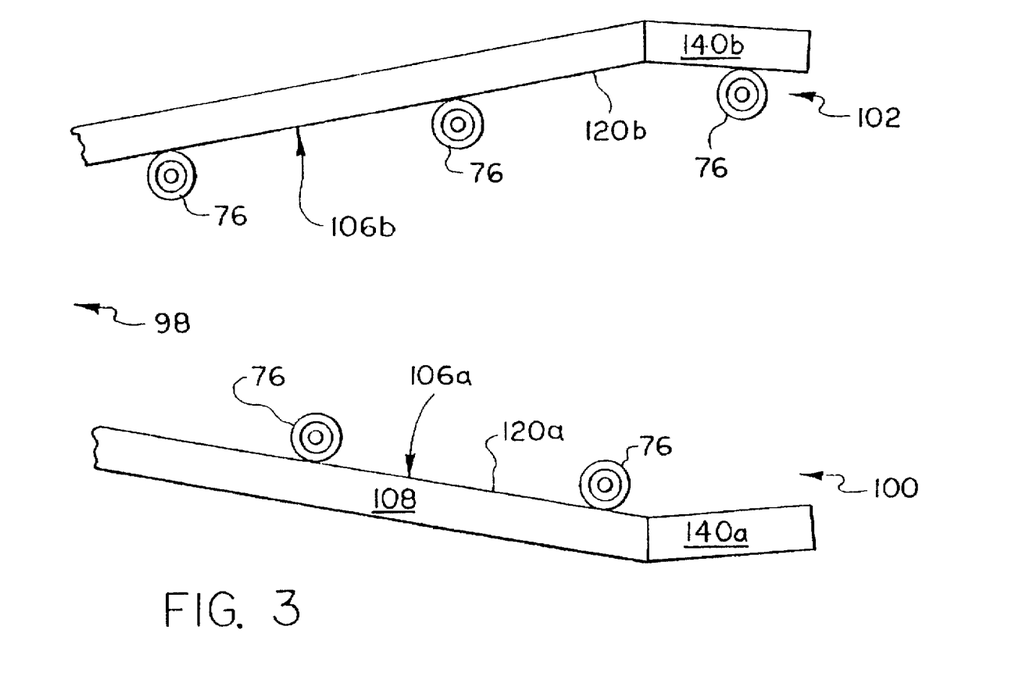
FIG. 3 is a sectional view taken generally along the line 3—3 in FIG. 1.

As will be apparent, pushing mechanisms 58 are slidably movable lengthwise of rods 84,84 in a direction extending transversely of path of travel 22 by displacing means 66, which in the preferred form of the invention shown in FIG. 1 includes a first means 94 operable on line 98 of pushing mechanisms 58 passing along lower flight 90 of upper conveyor 40 in the direction of first path of travel 22 in vertical alignment with line 42 of articles 20 to divide line 98 into two parallel lines of pushing mechanisms generally indicated at 100 and 102 in FIG. 3, which also travel in alignment with the first path of travel. Second means 90 is in turn operable on lines 100 and 102 of pushing mechanisms 58 to converge such lines into line 98, as the pushing mechanisms pass along upper flight 88 of the upper conveyor.

Figure 4:
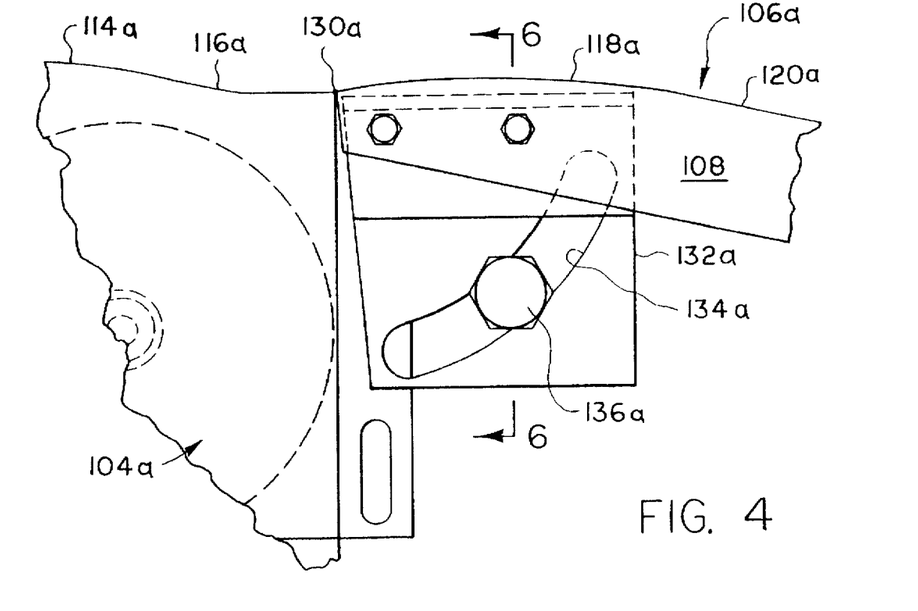
FIG. 4 is an enlarged fragmentary view of the upstream end of one of the guide surfaces shown in FIG. 2 showing one adjusted position of such guide surface.
Figure 5:
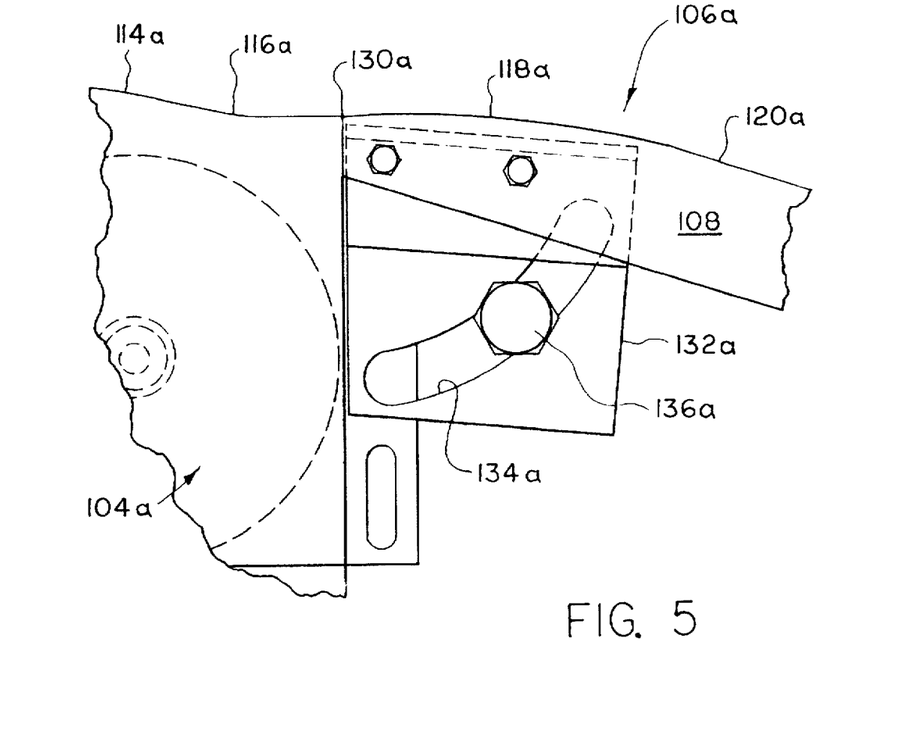
FIG. 5 is a view similar to FIG. 4, but showing a further adjusted position of such guide surface.
Figure 6:
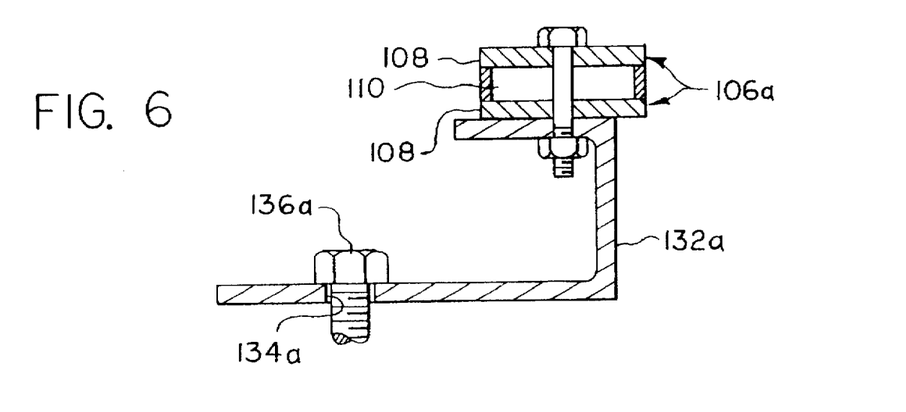
FIG. 6 is a sectional view taken generally along the line 6—6 in FIG. 4.

First means 94 is best shown in FIGS. 2–5 as including a selectively operable means, such as may be defined by a pair of selectively operable or energized electromagnets 104a and 104b; a pair of facing, elongated guide surfaces 106a and 106b shown for the case of guide surface 106a in FIG. 6 as being defined by aligned edges of a pair of parallel plates 108 and 108; and magnetic means shown only in FIG. 6 as being defined by plural permanent magnetic devices 110 sandwiched between plates 108 and 108. Electromagnets may be replaced by other known devices, such as pneumatically or mechanically operated gate flow directing devices, not shown.

Electromagnets 104a and 104b include facing guide edges having parallel upstream edge portions 112a and 112b, which are spaced apart sufficiently to freely receive members 76 of pushing mechanisms arranged in line 98 passing therebetween, divergent intermediate edge portions 114a and 114b; and parallel downstream edge portions 116a and 116b.

Elongated guide surfaces 106a and 106b are shown as including upstream portions 118a and 118b, which are generally aligned with downstream edge portions 116a and 116b, respectively, and divergent downstream portions 120a and 120b.

Second means 96 includes a pair of elongated guide or return bars 122a and 122b arranged to converge from adjacent second end 64 towards first end 62 of conveyor 40. It will be understood that the downstream ends of bars 122a and 122b are arranged to be engaged by members 76 of pushing mechanisms 58 traveling in lines 100 and 102, such that such mechanisms are forced to slide along rods 84 transversely of path of travel 22 until they are finally collected together for movement within line 98 by the time they reach conveyor first end 62. Curved extension guides 124a and 124b may be provided to transversely confine members 76 of the pushing mechanisms arranged in line 98 intermediate the discharge ends of the guide bars and electromagnet upstream edge portions 112a and 112b.

As thus for generally described, the construction and mode of operation of first means 94 and second means 96 of displacing means 66 corresponds to that described in U.S. Pat. No. 3,731,782 whose disclosure is incorporated by reference herein.

Figure 2:
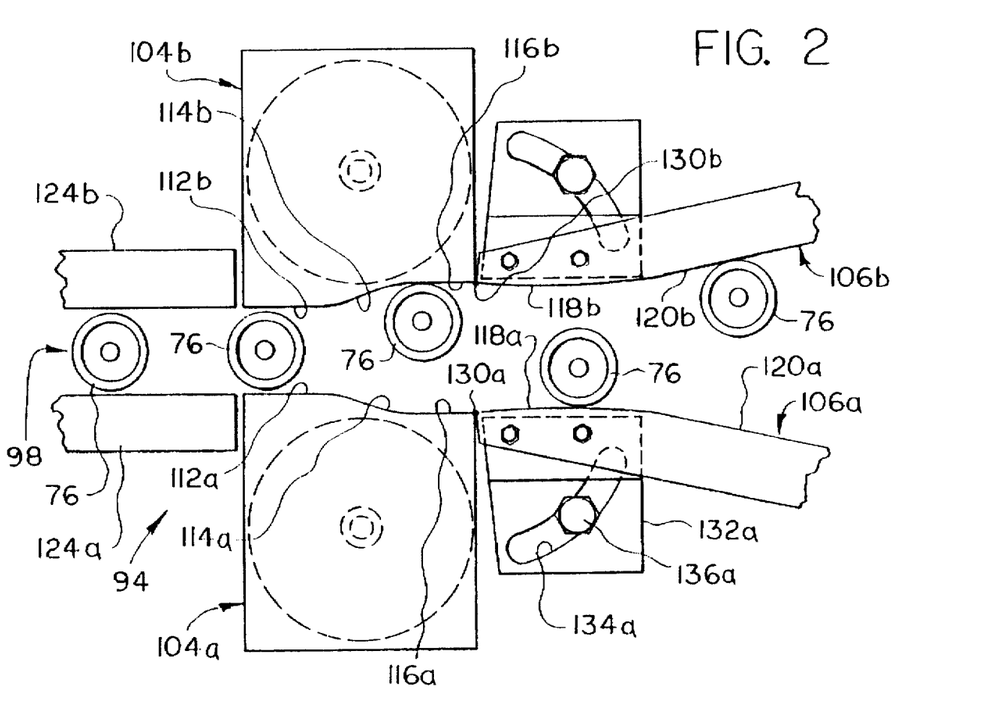
FIG. 2 is a sectional view taken generally along the line 2—2 in FIG. 1.

In accordance with the present invention, first means 94 differs from that described in U.S. Pat. No. 3,731,782 in that the upstream portions 118a and 118b of guide surfaces 106a and 106b are provided with a curved or convex configuration and such guide surfaces are supported for adjustment about a pair of pivot axes 130a and 130b extending essentially through the upstream ends of the upstream portions, as best shown in FIG. 2, whereby to permit swinging displacements of the guide surfaces as required to provide a desired transverse spacing between discharge lines 100 and 102, and line 98. As by way of example, adjustment of the guide surfaces may be effected, as shown for the case of surface 106a in FIGS. 4–6, by mounting plates 108 and 108 on a J-shaped bracket 132a, which is formed with an arcuate adjustment slot 134a having a center of curvature coincident with pivot axis 130a and adapted to be fixed in position by means including a mounting bolt 136a arranged to extend through the slot for receipt withing supporting framework, not shown.

As best shown in FIGS. 4 and 5, it is desirable that the upstream end or pivot point 130a of upstream surface portion 118a be arranged in alignment with electromagnet downstream edge portion 116a in the direction of the path of travel 22 in order to insure proper transfer of members 76 to upstream portion 118a across the slight gap or physical spacing provided to isolate the permanent magnet from the electromagnet. Upstream surface portion 118a may be swung between a first position shown in FIG. 4, wherein it projects slightly above downstream edge portion 116a, and a second position shown in FIG. 5, wherein it lies essentially tangent with the downstream edge portion. Throughout this range, upstream surface portion is intended to provide for proper landing or pick-up of members 76 and then smoothly lead such members into engagement with downstream portion 120a.

The position of FIG. 4 is desirable, since it forces members 76 to ride up on and make positive magnetic contact, with guide surface portion 118a, but the extent to which surface portion 118a may project above edge portion 116a decreases with conveyor speed in order to prevent members 76 from bouncing off of the permanent magnet and/or incurring excessive wear of the upstream surface portion. A position beyond FIG. 5 in a clockwise direction, wherein guide surface portion 118a would be recessed below edge portion 116a is not acceptable, since the strength of the permanent magnet would normally not be sufficient to insure proper transfer of members 76 to upstream surface portion 118a.

The radius of curvature and the arc length of upstream surface portion 118a are matters of compromise. In this respect, the larger the radius of curvature, the more "straight" guide surface portion 118a initially appears to members 76 passing from edge portion 116a and this increases the time allowed for such members to become magnetically attached to the guide surface portion. On the other hand, too large a radius of curvature may result in an unacceptable increase in the overall length of flight 90. Further, a greater arc length for a given radius of curvature is helpful in effecting desired transverse displacements of pushing mechanisms 58 within a shorter length of flight 90, but a drawback of an excessive arc length is the greater tendency for system frictional forces to cause members 76 to break away from downstream guide surfaces 120a.

Again referring to FIGS. 1–3, it will be understood that any suitable means, not shown, may be employed to selectively energize electromagnets 104a and 104b, so as for example, to divert members 76, and thus pushing mechanisms 58, transversely of inlet line 98 alternatively for engagement with guide surfaces 106a and 106b to create discharge lines 100 and 102 of pushing mechanisms. As a result of this movement, paddles 78 of successive pushing mechanisms are moved transversely of the path of travel 22 for purposes of displacing or pushing on articles 20 with which they are transversely aligned for purposes of forcing the aligned articles to slide transversely of surface 18 from inlet line 42 traveling within first or central region 44 so as to define outlet lines 46 and 48 traveling within second and third or side regions 50 and 52.

The sequence in which articles 20 are placed within lines 46 and 48 is dictated by system requirements. Further, one or the other selectively operable means 104a and 104b and their associated guide surfaces 106a and 106b may be dispensed with, and two outlet lines created by periodic actuations of a single electromagnet. Moreover, an additional discharge line may be created by providing separators, not shown, selectively placed along guide surfaces 106a and/or 106b in the manner disclosed in U.S. Pat. No. 3,731,782. Also, it will be appreciated the size and/or shape of articles may dictate that two or more pushing mechanisms be employed to move same transversely of path of travel 22.

In that the speed of the free ends or tips of paddles 78 is greater than their root ends, when the paddles are separated from articles 20 as an incident to movement of pushing mechanisms 58 about the periphery of socket 86 disposed at the second end of conveyor 40, there is a tendency for such paddles to upset articles or cause articles to be displaced, as by being swung to one side or the other. In accordance with the present invention, this potential problem is avoided by providing further means in the form of separator plates 140a and 140b shown in FIG. 3, as being disposed adjacent the downstream ends of downstream guide surface portions 120a and 120b to assume a slightly convergent relationship with respect to path of travel 22. The positioning of plates 140a and 140b is such that a paddle 78, which has been disposed in engagement with an article for purposes of displacing same transversely of path of travel is moved transversely away from frictional engagement with such article prior to initiation of swinging movement of such paddle about the axis of sprocket 86 arranged at conveyor end 64. Of course the degree of transverse movement of paddles 78 must necessitate to less than that which would result in a second paddle of a pair of paddles to be drawn into engagement with an opposite side of the previously engaged article.

Figure 8:
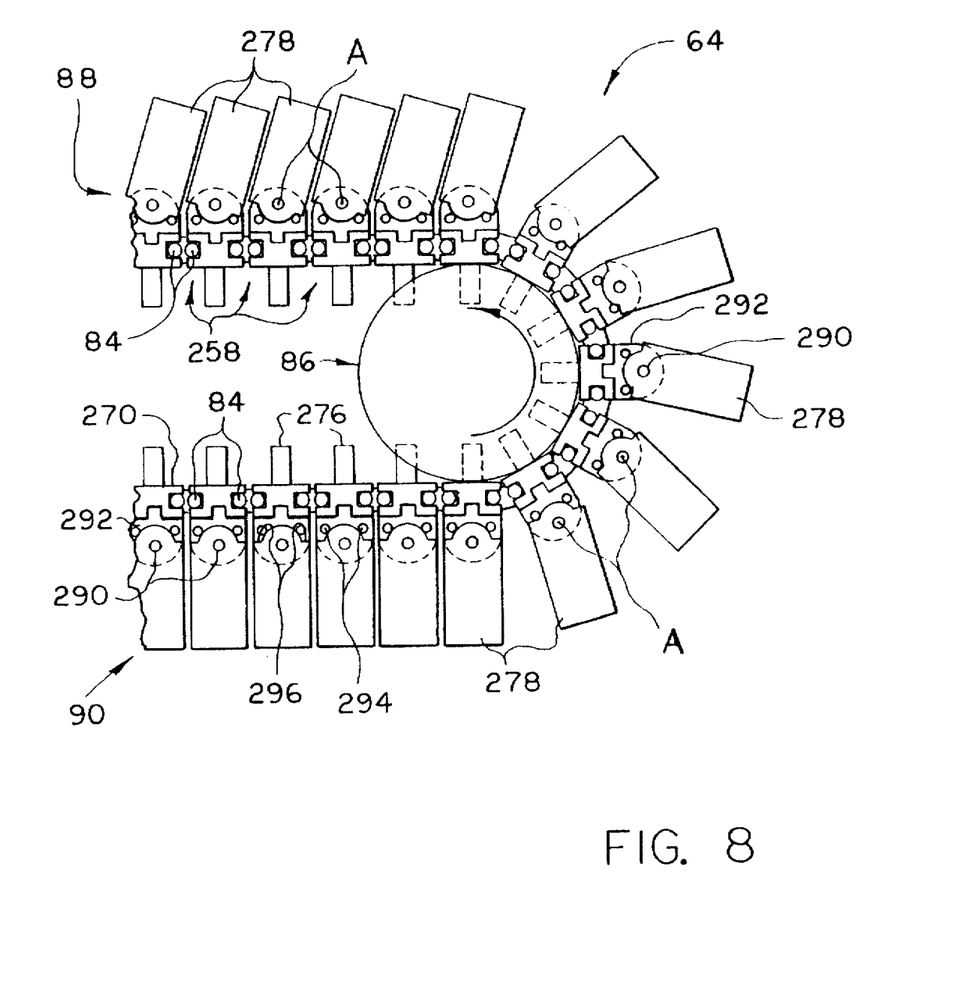
FIG. 8 is a view similar to FIG. 7, but showing a second type of pushing mechanism.
Figure 10:
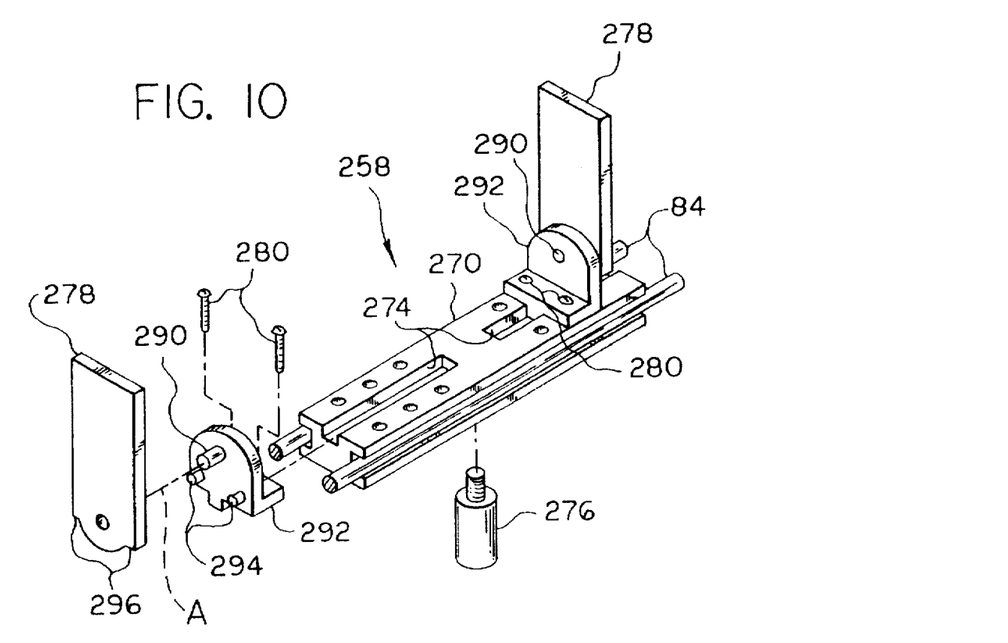
FIG. 10 is an exploded prospective view of the pushing mechanism of FIG. 9.

In an alternate form of the invention, the above-described potential problem of the tipping over of articles 20 adjacent second end 64 of conveyor 40 may be avoided by the construction shown in FIGS. 8 and 10, wherein pushing mechanism 58 is replaced by a pushing mechanism 258, wherein a pair of paddles 278 are supported on a slider 270 for pivotal or swinging movement about an axis "A", which extends transversely of path of travel 22 and is defined by a pair of stub shafts 290. Stub shafts 290 are carried by a pair of L-shaped mounting brackets 292 and 292 slidably received within slot 274 and retained in adjusted position lengthwise thereof by threaded fasteners 280. The extent of swinging movement of paddles 278 about axis "A" is limited by pairs of stop pins 294 and 294 mounted on each of brackets 292 and 292 for abutting engagement with pairs of paddle abutment surfaces 296 and 296, as best shown in FIG. 8. As with previously described mechanisms 58, mechanisms 258 each include a magnetically-attractable roller member 276.

As will be apparent from viewing FIG. 8, paddles 278 tend to pivot about axis "A" under the influence of gravity, such that they hang vertically downwardly in the direction of surface 18, during movement of their associated pushing mechanisms 258 along lower conveyor flight 90, and through an initial portion of travel about sprocket 86, such that separation of the paddles from aligned ones of articles 20 occurs solely or at least primarily by the lifting of the paddles upwardly away from such articles. Accordingly, articles are not subjected to being pushed over as a result of paddle separation.

Figure 11:
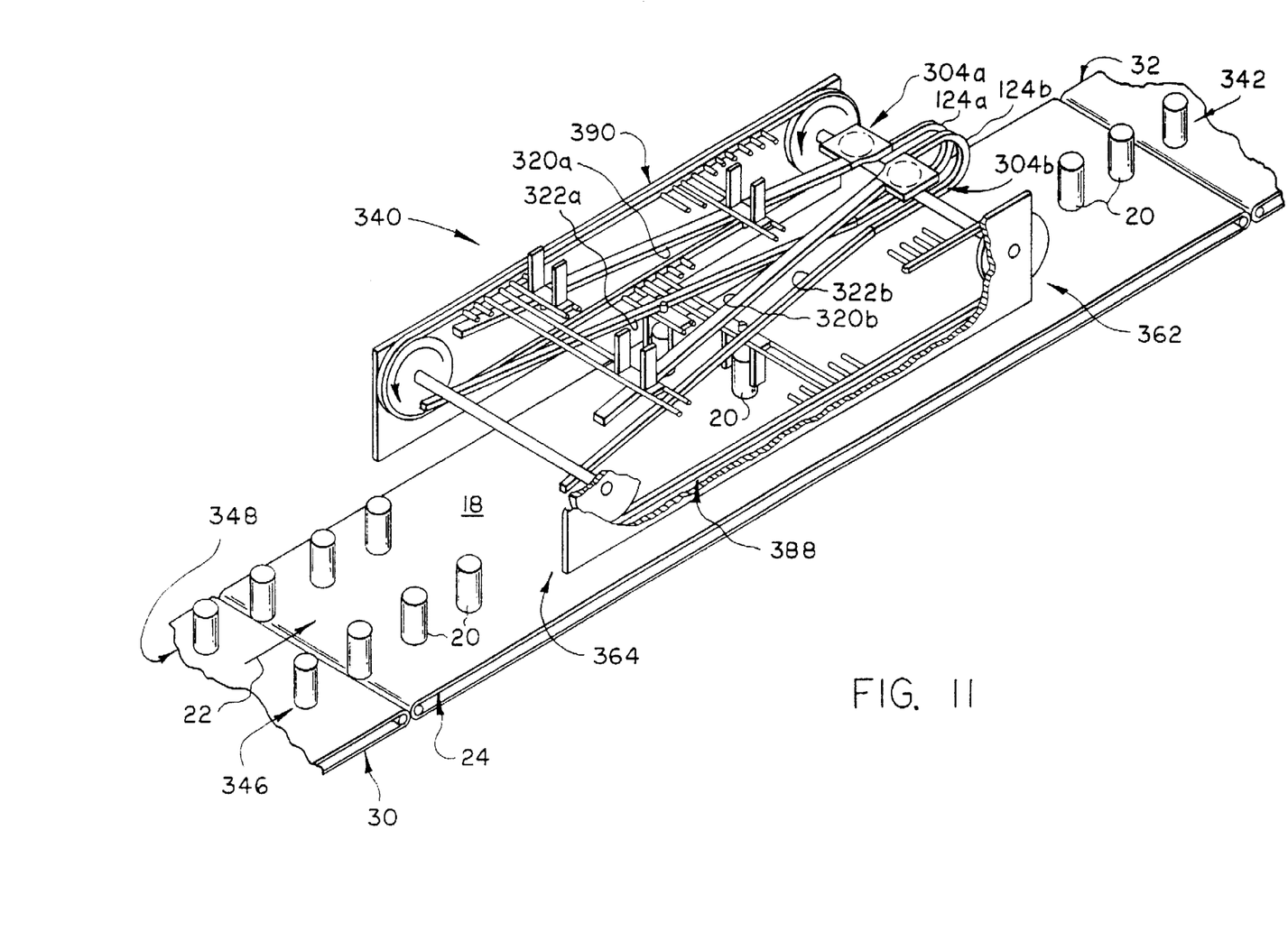
FIG. 11 is a fragmentary prospective view of a flow converging conveyor formed in accordance with the present invention

Reference is now made to FIG. 11 wherein conveyor 340 is shown as being identical in construction to previously-described conveyor 40, but inverted such that upper conveyor flight 88 becomes lower conveyor flight 388, and lower conveyor flight 90 becomes upper conveyor flight 390, and turned horizontally through 180°, such that first end 62 becomes second or outlet end 362, and second end 64 becomes first or inlet end 364. Thus, with this construction, conveyor 340 is employed to act on a pair of parallel inlet lines 346 and 348 of articles 20 to effect sliding movement thereof transversely of lower conveyor surface 18 to form a single outlet line 342.

What is claimed is:

1. A conveyor mechanism comprising:

a first conveyor defining an upwardly facing article supporting surface movable along a first path of travel between article inlet and outlet ends of said first conveyor; and a second conveyor disposed above said first conveyor for selectively displacing articles while supported by said surface between first and second regions spaced transversely of said first path of travel and arranged within the bounds of said surface as an incident to movement of said articles by said surface from said inlet end to said outlet end of said first conveyor, said second conveyor including at least one pushing mechanism, support means for supporting said pushing mechanism for movement along a second path of travel vertically aligned with said first path of travel between first and second ends of said second conveyor, while permitting displacement of said pushing mechanism transversely of said first and second paths of travel between said regions, and displacing means for selectively displacing said pushing mechanism when transversely aligned with an article for moving said article with which said pushing mechanism is aligned between said regions, said pushing mechanism comprises a paddle supported by said support means to depend from said second conveyor vertically towards said surface during movement of said pushing mechanism between said first and second ends, said paddle being movable by said displacing means for pushing against said article with which it is aligned to effect movement thereof from said first region to said second region, and further means are provided to force said paddle to move transversely of said path of travel out of engagement with said article with which it is aligned after arrival of said article in said second region and during subsequent movement of said article towards said outlet end, said support means includes a slider mounted for siding movement transversely of said second path of travel and carrying said paddle and a magnetically attractable member, said displacing means includes a guide surface extending between said first and second regions and magnetically attractable means for magnetically attracting said member for movement along said guide surface between said first and second region, and said further means is another guide surface and extending from said guide surface of said displacing means in said second region relatively towards said first region.

2. A conveyor mechanism comprising:

a first conveyor defining an upwardly facing article supporting surface movable along a first path of travel between article inlet and outlet ends of said first conveyor; and a second conveyor disposed above said first conveyor for selectively displacing articles while supported by said surface between at least first and second regions spaced transversely of said first path of travel as an incident to movement of said articles by said surface from said inlet end to said outlet end of said first conveyor, said second conveyor including at least one pushing mechanism, support means for supporting said pushing mechanism for movement along a second path of travel vertically aligned with said first path of travel between first and second ends of said second conveyor, while permitting displacement of said pushing mechanism transversely of said first and second paths of travel between said regions, and displacing means for selectively displacing said pushing mechanism when transversely aligned with an article for moving said article with which said pushing mechanism is aligned between said regions, said pushing mechanism comprises a slider supported for free sliding movement transversely of said second path of travel, a pair of paddles, and means to adjustably support said paddles on said slider in a parallel relationship and for adjustment of the spacing between said paddles in a direction extending transversely of said second path of travel.

3. A mechanism according to claim 2, wherein said paddles are supported for pivotal movement relative to said slider about an axis extending transversely of said second path of travel.

4. A conveyor mechanism comprising:

a first conveyor defining an upwardly facing article supporting surface movable along a first path of travel between article inlet and outlet ends of said first conveyor; and a second conveyor disposed above said first conveyor for selectively displacing articles while supported by said surface between at least first and second regions spaced transversely of said first path of travel as an incident to movement of said articles by said surface from said inlet end to said outlet end of said first conveyor, said second conveyor including at least one pushing mechanism, support means for supporting said pushing mechanism for movement along a second path of travel vertically aligned with said first path of travel between first and second ends of said second conveyor, while permitting displacement of said pushing mechanism transversely of said first and second paths of travel between said regions, and displacing means for selectively displacing said pushing mechanism when transversely aligned with an article for moving said article with which said pushing mechanism is aligned between said regions, said pushing mechanism comprises a paddle supported by said support means for pivotal movement about an axis extending transversely of said second path of travel and tending under the influence of gravity to depend from said second conveyor vertically towards said surface during movement of said pushing mechanism along said second path of travel from said first end to said second end, said support means including a slider mounted for sliding movement transversely said second path of travel and carrying stop means arranged for engagement by said paddle to limit the extend of said pivotal movement thereof.

5. A conveyor mechanism comprising:

a first conveyor defining an upwardly facing article supporting surface movable along a first path of travel between article inlet and outlet ends of said first conveyor; and a second conveyor disposed above said first conveyor for selectively displacing articles while supported by said surface between at least first and second regions spaced transversely of said first path of travel as an incident to movement of said articles by said surface from said inlet end to said outlet end of said first conveyor, said second conveyor including at least one pushing mechanism, support means for supporting said pushing mechanism for movement along a second path of travel vertically aligned with said first path of travel between first and second ends of said second conveyor, while permitting displacement of said pushing mechanism transversely of said first and second paths of travel between said regions, and displacing means for selectively displacing said pushing mechanism when transversely aligned with an article for moving said article with which said pushing mechanism is aligned between said regions, said displacing means selectively displaces said pushing mechanism to move articles engaged thereby from said first region in opposite directions into said second region or into a third region, said pushing mechanism comprises a slider supported for free siding movement transversely of said second path of travel, a pair of paddles, and means to support said paddles on said slider in a parallel relationship with a spacing sufficient to freely receive said articles therebetween, a first paddle of said pair of paddles being adapted to be engaged with an aligned article for pushing same from said first region into said second region and a second paddle of said pair of paddles being adapted to be engaged with an aligned article for pushing same from said first region into said third region, and further means are provided in said second and third regions for moving said first and second paddles transversely of said paths of travel from said second paddles transversely of said paths of travel from said second and third regions relatively towards said first region to effect removal thereof from pushing engagement with an article with which it is engaged.

6. A conveyor mechanism comprising:

a first conveyor defining an upwardly facing article supporting surface movable along a first path of travel between article inlet and outlet ends of said first conveyor; and a second conveyor disposed above said first conveyor for selectively displacing articles while supported by said surface between at least first and second regions spaced transversely of said first path of travel as an incident to movement of said articles by said surface from said inlet end to said outlet end of said first conveyor, said second conveyor including at least one pushing mechanism, support means for supporting said pushing mechanism for movement along a second path of travel vertically aligned with said first path of travel between first and second ends of said second conveyor, while permitting displacement of said pushing mechanism transversely of said first and second paths of travel between said regions, and displacing means for selectively displacing said pushing mechanism when transversely aligned with an article for moving said article with which said pushing mechanism is aligned between said regions, said pushing mechanism comprises a slider supported for free sliding movement transversely of said second path of travel, a magnetically attractable member, and at least one paddle arranged to depend from said slider towards said surface during movement of said pushing mechanism along said second path of travel, said slider being selectively movable by said displacing means for pushing said paddle against an article when aligned therewith to effect movement thereof from said first region to said second region, and said displacing means includes selectively operable means, an elongated guide surface having upstream and downstream portions extending generally in the direction of said path of travel, and a magnetically attractable means, said upstream portion being convex, said guide surface being supported for adjustment about a pivot axis extending normal to said surface and passing essentially through an upstream end of said upstream portion of said guide surface, and said magnetically attractable means magnetically attracts said member for movement along said guide surface whenever said member is placed in engagement with said upstream end of said upstream portion of said guide surface, and said selectively operable means is operable to selectively move said slider from said first region transversely of said second path of travel to place said member thereof in engagement with said upstream end of said upstream portion of said guide surface.

7. A mechanism according to claim 6, wherein further means are arranged adjacent said downstream portion of said guide surface to engage said member for moving said paddle transversely of said second path of travel out of engagement with said article with which it is aligned upon arrival thereof in said second region.

8. In a conveyor of the type having a plurality of sliders transported for movement along a path of travel, while being displaceable transversely of said path of travel between first and second regions, each of said sliders mounting a magnetically attractable member; and displacing means for selectively moving said sliders between said first and second regions, said displacing means including selectively operable means, an elongated guide surface having an upstream portion disposed adjacent said first region and a downstream portion extending from said upstream portion to said second region in a divergent relationship to the direction of said path of travel, and magnetic means for attracting said member for movement along said guide surface whenever said member is initially placed in engagement with said upstream portion, and said selectively operable means is operable to selectively move said slider from said first region transversely of said path of travel to place said member thereof in engagement with said upstream portion of said guide surface, the improvement comprising in combination:

said upstream portion is of convex configuration; and said guide surface is supported for adjustment about a pivot axis extending essentially through an upstream and of said upstream portion of said guide surface, whereby to permit adjustment of the distance between said first region and a downstream end of said downstream portion of said guide surface transversely of said path of travel.

9. The improvement according to claim 8, wherein a pair of parallel paddles are mounted on said slider for adjustment of the distance therebetween in a direction extending transversely of said path of travel.

10. The improvement according to claim 8, wherein a pair of paddles are supported on said slider for pivotal movement about a pivot axis extending transversely of said path of travel.

11. In a conveyor of the type having a plurality of sliders carried for movement along a path of travel while being displaceable transversely thereof between a first region, and second and third regions disposed on opposite sides of said first region transversely of said path of travel, each of said sliders mounting a magnetically attractable member; and displacing means for selectively moving said sliders from said first region into said second and third regions, said displacing means including first and second guide surfaces extending from adjacent said first region to said second and third regions, respectively, and each of said guide surfaces having an upstream portion and a downstream portion, magnetic means for attracting said member for movement along one of said guide surfaces whenever said member is initially placed in engagement with said upstream portion thereof, and selectively operable means for selectively moving said sliders from said first region transversely of said path of travel to position said members thereof in engagement with said upstream portion of a selected one of said first and second guide surfaces, the improvement comprising in combination:

said first and second guide surfaces are supported for adjustable pivotal movement about a pair of parallel pivot axes arranged essentially coincident with upstream ends of said upstream portions of said guide surfaces, thereby to permit adjustment of the distances of downstream ends of said downstream portions of said guide surfaces from said first region transversely of said path of travel; and said upstream portions of said guide surfaces are convex.

12. A conveyor mechanism comprising:

a first conveyor defining an upwardly facing article supporting surface movable along a first path of travel between article inlet and outlet ends of said first conveyor; and a second conveyor disposed above said first conveyor for displacing articles while supported by said surface transversely of said first path of travel as an incident to movement of said articles by said surface from said inlet end to said outlet end of said first conveyor, said second conveyor including first and second flights vertically aligned with said first path of travel, a plurality of pushing mechanisms, support means for supporting said pushing mechanisms for movement along said first and second flights, while permitting displacement of said pushing mechanisms transversely of said first path of travel, and displacing means for displacing said pushing mechanisms transversely of said first path of travel, said displacing means including a first means operable on a line of said pushing mechanisms traveling in alignment with said first path of travel to divide said line into at least two parallel lines of pushing mechanisms traveling in alignment with said first path of travel, as said pushing mechanisms pass along said first of said flights, and second means operable on said at least two lines to converge said lines into said line, as said pushing mechanisms pass along said second of said flights, one of said flights being arranged in a facing relationship to said surface, and said pushing mechanisms passing along said one of said flights engaging with said articles for displacing said articles transversely of said first path of travel, each of said pushing mechanisms includes a magnetically attractable member; and said first means includes selectively operable means, an elongated guide surface having an upstream portion disposed transversely adjacent said line and a downstream portion extending from said to upstream portion in a divergent relationship to the direction of said path of travel, and magnetic means attracting said member for movement along said guide surface whenever said member is initially placed in engagement with said upstream portion, said selectively operable means is operable to selectively move said pushing mechanisms from said line transversely of said path of travel to place said member thereof in engagement with said upstream portion of said guide surface, said upstream portion is of convex configuration, and said guide surface is supported for adjustment about a pivot axis extending essentially through an upstream end of said upstream portion of said guide surface, whereby to permit adjustment of the distance between said line and a downstream end of said downstream portion of said guide surface transversely of said path of travel.

13. A conveyor mechanism according to claim 12, wherein each of said pushing mechanisms includes an article engaging paddle arranged to depend from said second conveyor towards said surface as said pushing mechanisms pass along said one of said flights, and further means are provided to move said paddle transversely of said path of travel out of engagement with an article with which it is aligned in a direction extending transversely of said path of travel upon arrival of said article adjacent said downstream end of said downstream portion of said guide surface.

* * * * *

UNITED STATES PATENT AND TRADEMARK OFFICE
CERTIFICATE OF CORRECTION

PATENT NO. : 5,722,532
DATED : March 3, 1998
INVENTOR(S) : David A. Troisi, et. al.

It is certified that error appears in the above-identified patent and that said Letters Patent is hereby corrected as shown below:

Column 2, line 3, change "76" to --78--
Claim 1, column 2, line 1, change "siding" to --sliding--
Claim 5, starting on line 50, the following phrase is duplicated:

"second paddles transversely of said paths of travel from said"

Signed and Sealed this

Twentieth Day of October, 1998

Attest:

BRUCE LEHMAN

Attesting Officer

Commissioner of Patents and Trademarks